Oct. 4, 1938.    M. KADENACY    2,131,959
TIMING OF THE INLET AND EXHAUST ORIFICES OF
TWO-STROKE INTERNAL COMBUSTION ENGINES
Filed June 8, 1936    8 Sheets-Sheet 5
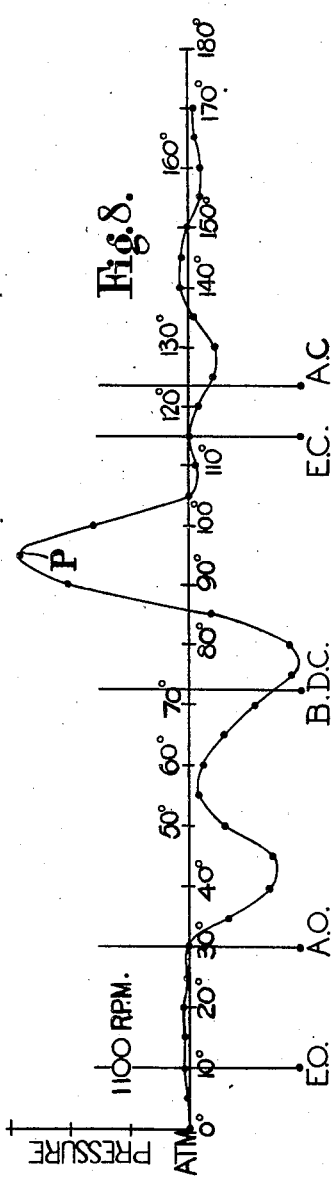
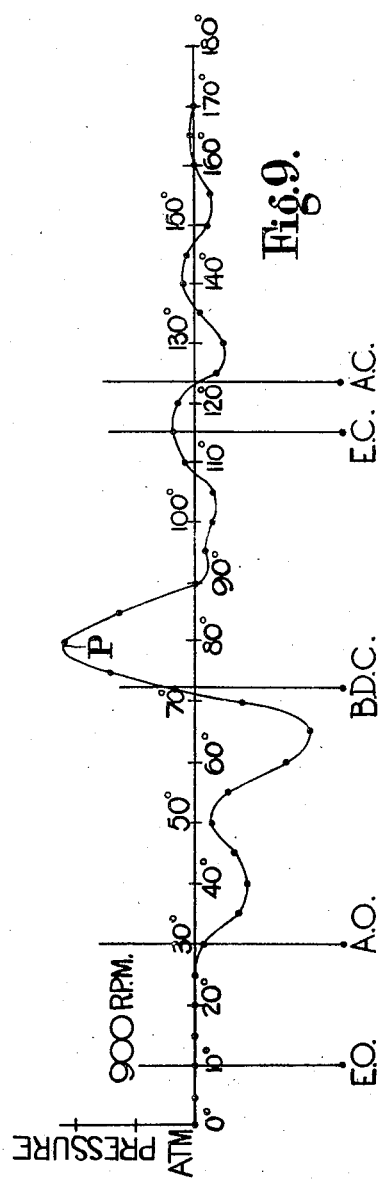
Inventor: M. Kadenacy
By Glascock Downing & Seebold
Attys.

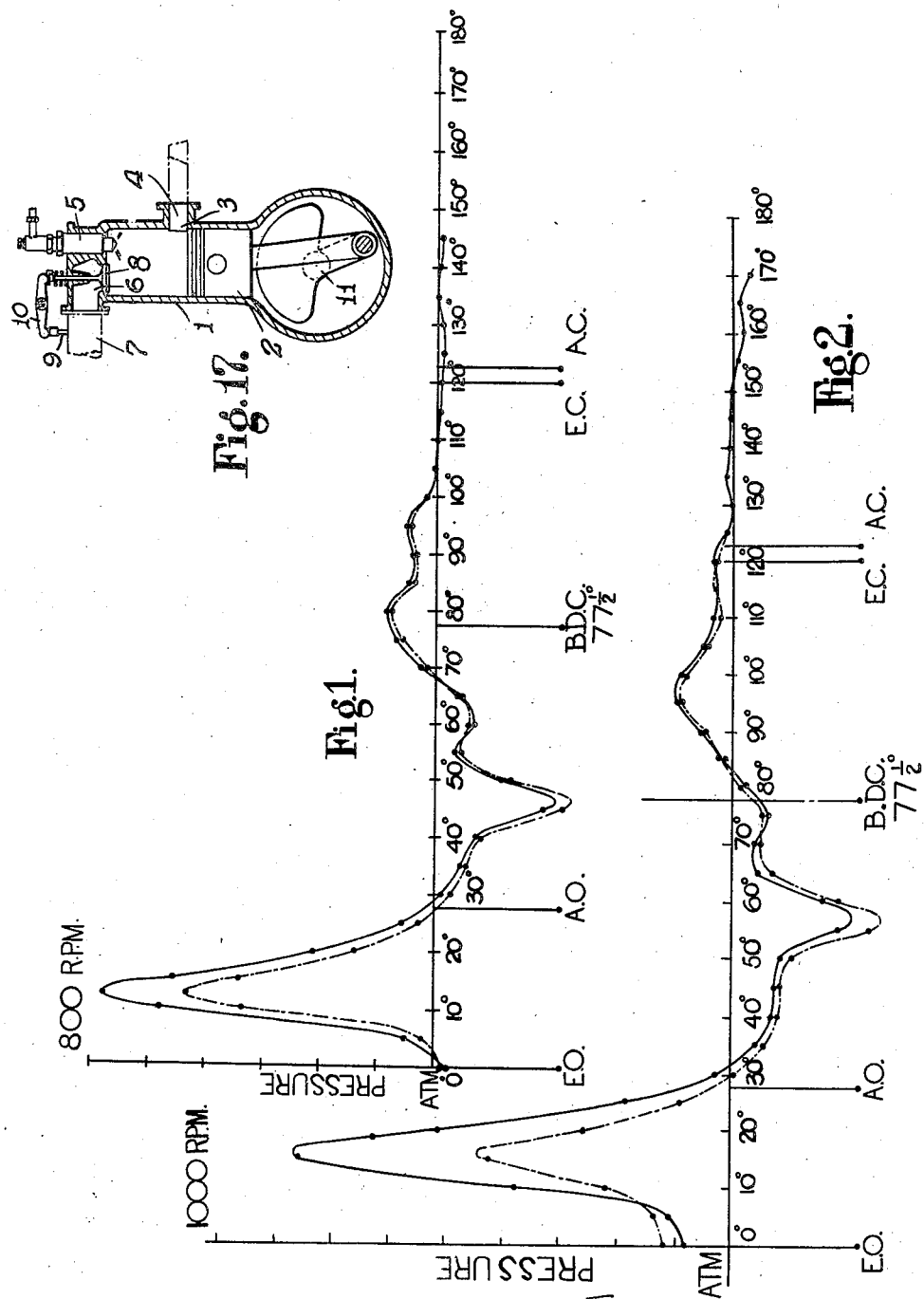

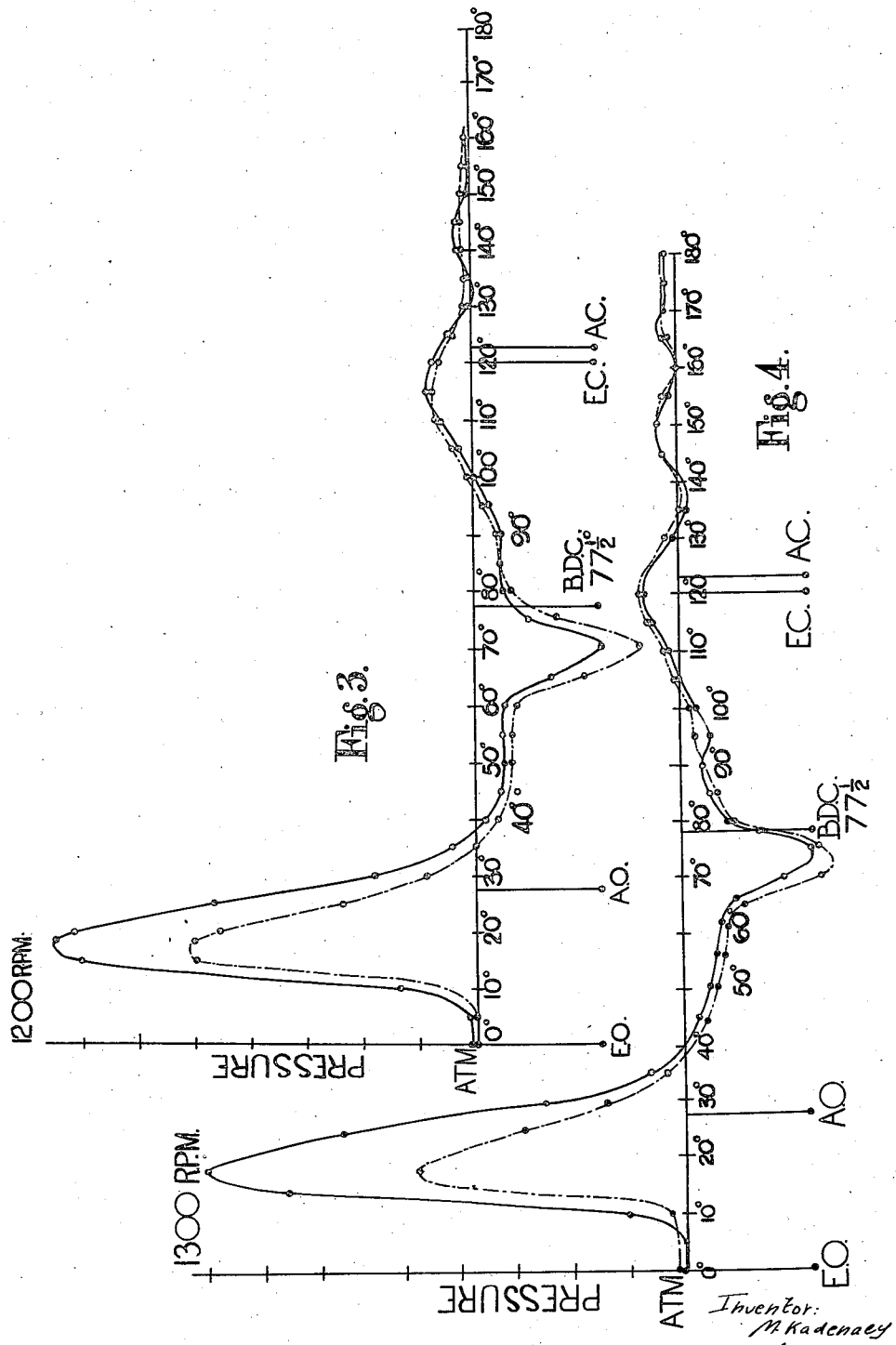

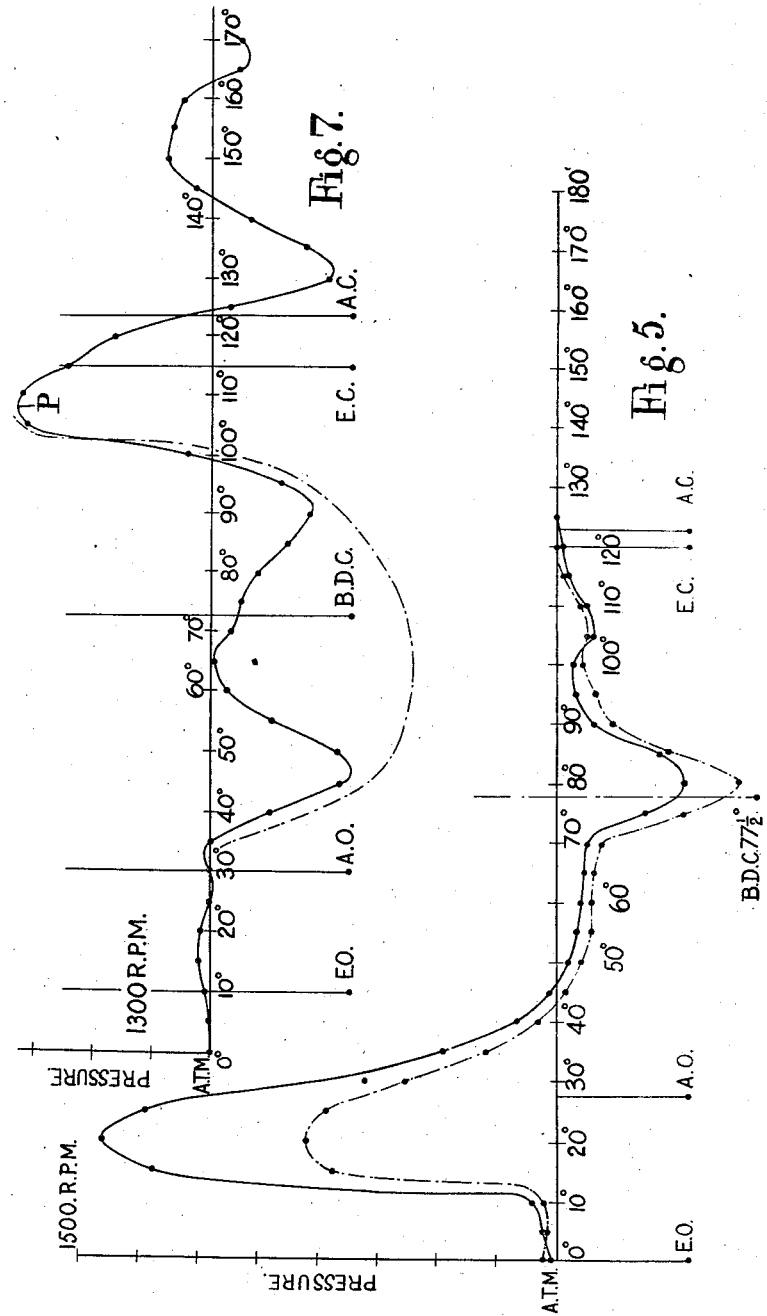

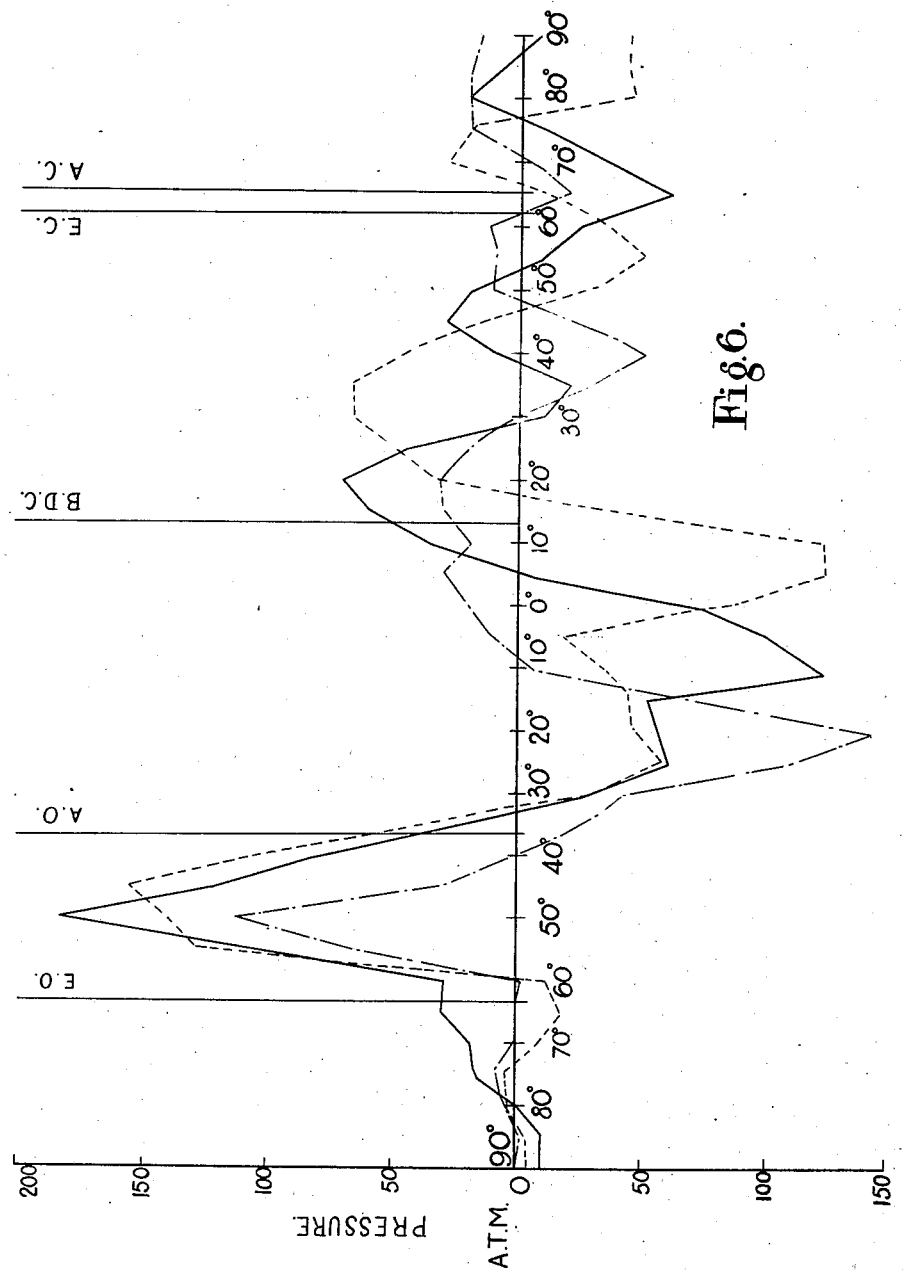

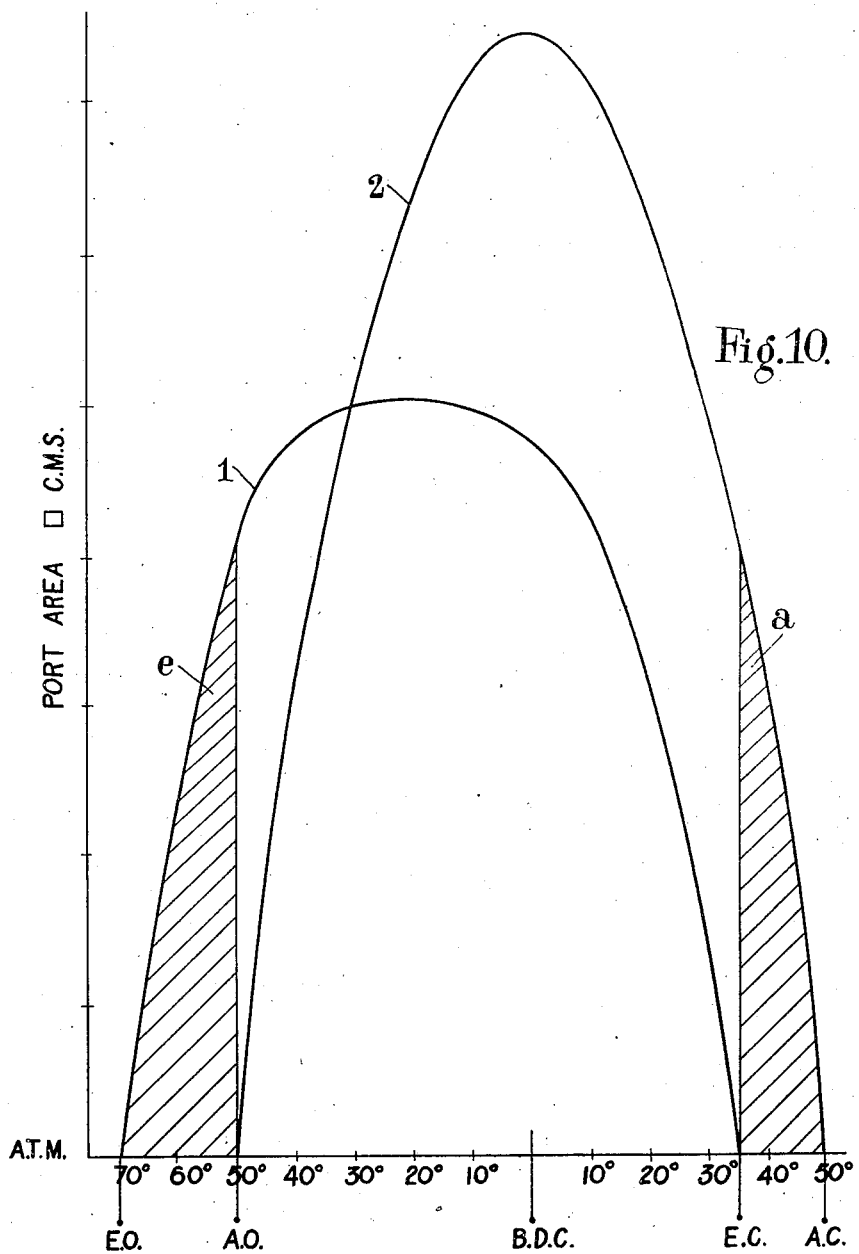

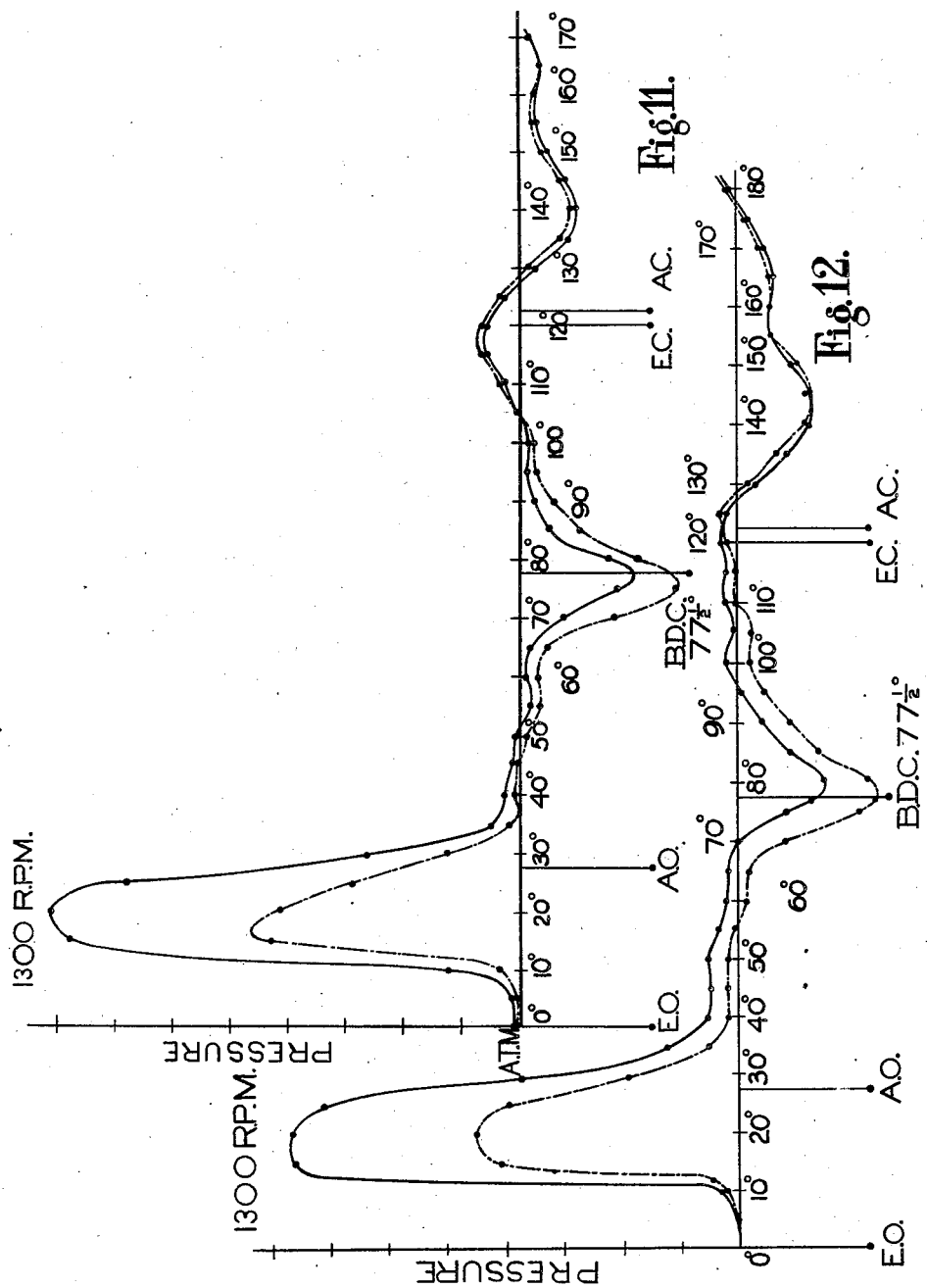

Oct. 4, 1938.        M. KADENACY        2,131,959
TIMING OF THE INLET AND EXHAUST ORIFICES OF
TWO-STROKE INTERNAL COMBUSTION ENGINES
Filed June 8, 1936        8 Sheets-Sheet 8
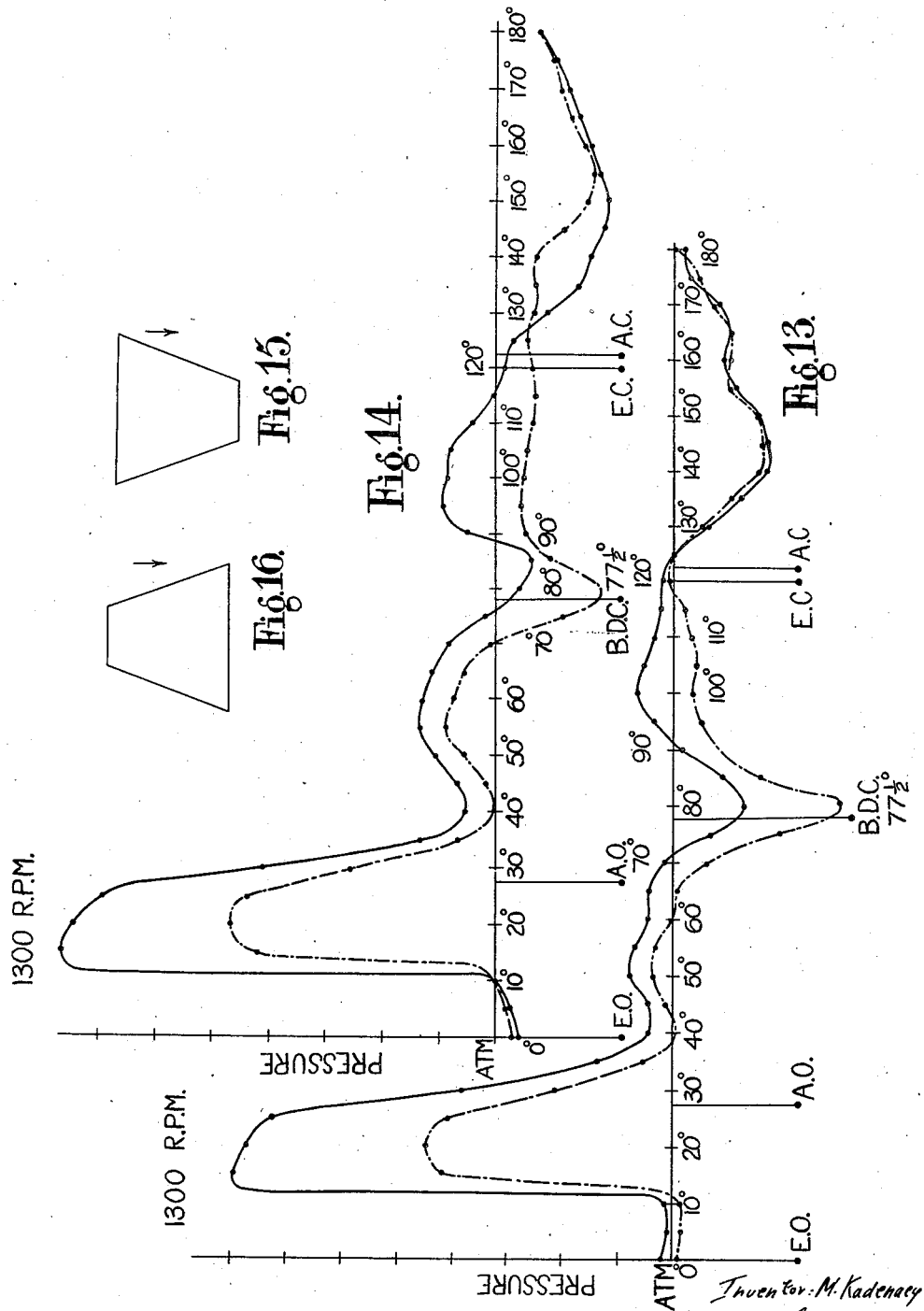

Patented Oct. 4, 1938

2,131,959

UNITED STATES PATENT OFFICE 2,131,959

TIMING OF THE INLET AND EXHAUST ORIFICES OF TWO-STROKE INTERNAL COMBUSTION ENGINES

Michel Kadenacy, Paris, France, assignor of one-half to Armstrong Whitworth Securities Company, Limited, London, England Application June 8, 1936, Serial No. 84,184
In Great Britain January 11, 1936

3 Claims. (Cl. 123—65)

This invention relates to a method of constructing two-stroke cycle internal combustion engines of the kind wherein at least a substantial portion of the burnt gases leaves the cylinder at a speed much higher than that obtaining when an adiabatic flow only is involved, and in such a short interval of time that it is discharged as a mass leaving a depression behind it which is utilized in introducing a fresh charge into the cylinder by opening the inlet orifice with the required delay after the opening of the exhaust orifice to ensure that the burnt gases are then moving outwardly through the exhaust orifice or duct and that a suction effect is exerted at the inlet orifice as a consequence of the exit of the said mass.

In application Serial No. 84,182 filed June 8, 1936, the characteristics that should be possessed by the exhaust and inlet orifices of such engines in order to obtain a maximum output at varying speeds have been specified. It is indicated in the said specification that the exhaust and inlet orifices must be made as large as possible within mechanical limits and that the full area of the said orifices must be opened as rapidly as possible and that the inlet orifice should open as close as possible to the moment of exit of the burnt gases to provide a permissible opening of inlet over a speed range of the engine, whereby the maximum charge may be introduced into the cylinder in the time available; and it is also indicated in the said specification that provision should be made to ensure that the charge will be retained in the cylinder and will not be forced out or sucked out by movements of the exhaust gases.

In one embodiment of the invention, the inlet is arranged to open at a constant crank angle after the commencement of exhaust opening, this crank angle being so chosen that at the varying engine speeds, inlet will always open at a suitable moment for the introduction of the charge and as close as possible to the moment of exit of the burnt gases, the exhaust system being such that the outward movement of the burnt gases will continue for a sufficient length of time to permit the said timing to be established, and means being provided in the exhaust system which cause the duration of time of exhaust to be reduced progressively as the speed of the engine increases, whereby the increase in the angle occupied by the exhaust at increasing engine speeds can be reduced to a minimum.

In a further embodiment of the invention the exhaust is arranged to close after a constant crank angle from the commencement of exhaust or from a suitably chosen point on the rotation of the crank shaft, this angle being so established that exhaust will always close, at the varying engine speeds, when the inlet has opened and the incoming charge is passing through the cylinder, after the exit of the burnt gases from the cylinder has been completed and before any return impact occurs, a suitable exhaust system being provided which ensures that the outward movement of the burnt gases will continue for a sufficient length of time to permit the said timing to be established.

As in the case of inlet opening at a constant crank angle, this closure of exhaust at a constant crank angle will also be an arbitrary choice.

In a still further embodiment of the invention, in order to enable the time of passage of the incoming charge through the cylinder to be constant in its duration at the varying engine speeds, the exhaust is arranged to close at a constant time interval after the commencement of exhaust opening, whereby the exhaust will always close at the varying engine speeds at the same moment in time absolute relative to the return of the burnt gases, a suitable exhaust system being provided to ensure that the outward movement of the burnt gases will continue for a sufficient length of time to permit the said timing to be established.

The invention will now be described in greater detail with reference to the accompanying drawings.

In the drawings:

Figures 1 to 5 are curves of pressures taken on the exhaust duct of an internal combustion engine at varying engine speeds.

Figure 6 shows three curves of variations of pressure in the exhaust duct for the same engine speed but with different lengths of exhaust pipe.

Figures 7, 8 and 9 show three curves of pressures taken on the inlet duct of an engine, and Figure 10 is an exhaust and inlet port area diagram.

Figures 11 to 14 are curves of pressures taken on an engine at the same speed but with the use of a source of compressed air for charging the engine.

Figures 15 and 16 are diagrammatic representations of exhaust port openings serving to illustrate the invention.

Figure 17 shows, by way of example, a two-stroke cycle internal combustion engine to which the present invention has been applied.

In all of Figures 1 to 14, EO, EC, and AO, AC represent exhaust opening and closing and inlet opening and closing respectively, and BDC indicates bottom dead centre.

The curves shown in Figures 1 to 9 and 11 to 14 were obtained by means of the pressure indicating device described in application Serial No. 82,958 filed June 1, 1936, and the curves shown in Figures 1 to 5 and 11 to 14 are double pressure records taken with an indicator device comprising a double Pitot tube in operative communication with a manometer, the pressure readings being taken in synchronization with the engine cycle and being adjustable relative to the cycle, thereby enabling direction of movement and the velocity of the gases to be observed or determined.

It will be noted that each of Figures 1 to 5 and 11 to 14 comprises two curves, one in full lines and one in chain dotted lines. Where the full line curve is above the dotted line curve, it is to be understood that the movement is in the direction leading away from the cylinder. The pressure difference between the ordinates of the two curves at any particular crank angle is also a measure of the velocity with which the gases are moving at this moment.

From a consideration of the double pressures shown in any of Figures 1 to 5, it will be seen that after the commencement of exhaust opening, a delay occurs during which substantially no pressure difference exists and during which the direction of movement of the gases may be towards or away from the cylinder.

Thereafter the pressure difference increases rapidly to a maximum value which remains substantially constant for a time period which is substantially the duration of passage of the column of exhaust gases past the indicating device.

The movement then continues in an outward direction and the cylinder and exhaust piping remain under a depression while the entering admission current is passing through.

The curves also indicate in a very clear manner the moment when the movement of the exhaust gases and the admission gases which follow them is suddenly reversed in direction.

The delay that occurs between the commencement of opening of the exhaust and the moment when the column of burnt gases engages in the exhaust duct may be explained as follows:

When the exhaust orifices commence to open the total area opened is too small for the gaseous body formed by the exhaust gases to engage therein.

After a certain lapse of time this area becomes sufficient for the column to engage therein with its ballistic velocity and this is the true moment of commencement of the mass exit of the burnt gases from the cylinder. The delay in the commencement of the mass exit of the burnt gases is further due to the inertia of the gases which are moving in the cylinder at the moment of exit and this inertia must be understood as a change of direction of movement of the gases and not a change from a state of rest to a velocity.

The curves show that when the burnt gases engage in the exhaust duct the rise in pressure to a peak and the consequent fall are extremely abrupt.

The speed of exhaust, that is of the mass exit of the burnt gases is determined by the energy of the gases at the moment of exhaust. The curves show that this speed is very high and everything occurs as if the gases already had an initial velocity in the cylinder.

The duration of exhaust, that is to say, the duration of the passage of the mass of burnt gases through the exhaust orifice depends on further factors, if the speed of the burnt gases is considered to be constant for the moment, since this initial speed varies according to the intensity of the explosion per unit mass.

The first factor is the rate of opening of the orifice through which the exhaust is effected. It is advantageous for this rate to be as great as possible since in this way the length of the column formed by the issuing mass of burnt gases will be shorter and the duration of its passage through the exhaust orifice will be reduced.

Secondly, the medium which the mass of burnt gases encounter on their path from the cylinder exerts a resistance on account of its inertia. The smaller the volume of this medium, within limits, the smaller will be the negative acceleration of the mass of burnt gases, in other words they will retain their velocity longer when this resistance is small.

Further, the mass of burnt gases possesses viscosity and if the exhaust orifice has the shape of a slit, this will produce too great a deformation of the gases which will lag in penetrating the exhaust duct and in becoming transformed into a column.

Similarly, if the exhaust duct beyond the exhaust orifice has too small a cross section relative to the area of exhaust orifice open at the moment of exit of the burnt gases, this will exert a further compression and braking action on the burnt gases.

On the other hand, if the exhaust duct following the exhaust orifice is too large relative to the area of this orifice, the head of the column is crushed or flattened and the impact surface of the column increases in size, thereby reducing the path travelled before the rebound occurs.

The curves shown in Figures 1 to 5 were all taken on the same engine with the same exhaust system. These curves enable us to see the absolute duration of time during which the exhaust occurs, the duration in absolute time for which the depression, or the current of entering air, lasts in the cylinder or exhaust piping and the moment of reversal of the direction of movement of the gases, all these times being measured from the exact moment at which the exhaust orifice is opened.

From these curves it can be seen that for a definite arrangement of the exhaust system the complete exit of the burnt gases from the cylinder occupies a substantially constant lapse of time from the moment when the exhaust orifice commences to open, but that this lapse of time tends to decrease with increasing speeds due to factors related to the rate of opening of these orifices or the modification in the resistance afforded by the gaseous medium present on the path of the mass of burnt gases.

The curves also show that the moment of reversal in direction of movement of the gases is separated from the commencement of exhaust or in practice from the commencement of opening of the exhaust orifices, by a substantially constant duration of time.

The duration of the vacuum or of the admission current is also substantially constant in time. This can also be seen from Figures 7, 8 and 9.

All this is independent of the speed of rotation of the engine, other things being equal, and the inventor has also found that variation in intensity of the explosion in the engine varies these times only in an insignificant manner.

In establishing an engine in accordance with the invention the above phases must be taken into consideration in order to ensure that the engine may be supplied with its charge during the angular sector which has been chosen for evacuating and charging the engine and outside which the cylinder is closed completely for the compression and working strokes of the piston.

The filling of the cylinder is dependent upon the area of the charging orifices, the time of opening of these orifices and the differences in pressure which exist in the inlet ducts and the cylinder itself and also in the exhaust ducts which communicate directly with the cylinder when charging takes place.

It is useful to note that it is not only the static pressures that are important and that the velocity acquired by the entering charge also enters into consideration. During the admission period, the column of entering charge follows the column of exhaust gases which is moving in the direction of exhaust and which may itself be under a very high static pressure and irrespective of the static pressure within the exhaust column, the volume of the void left behind this column in the cylinder and in the exhaust ducts may increase at a higher rate than it can be filled by the entering charge. The greater the volume of the void left by the issuing gases and the more delayed the return of these gases, the higher will be the velocity acquired by the entering charge.

In all the curves shown in Figures 1 to 5, the fall in pressure consequent upon the mass exit from the cylinder is partially arrested by the entering current of admission gases consequent upon the opening of inlet and the influence of the return impact of the burnt gases is reduced by the provision in the exhaust duct of the means described in application Serial No. 46,805, filed October 25, 1935, which cause the return of the burnt gases to be by-passed into a chamber other than the engine cylinder.

But it can be shown that the return of the gases in general occurs at a very high speed and that it is clearly defined by a dense frontal zone which confirms that its nature is that of a body that rebounds from the obstacle it has encountered.

It can also be shown that if no inlet is opened after the mass exit of the burnt gases occurs, a volume of vacuum is left in the cylinder and in the exhaust ducts and the exhaust gases after their rebound encounter no obstacle upon their return path towards the cylinder.

Consequently the return is much more vigorous, it enters the cylinder at a much greater speed, and the duration of the vacuum in the cylinder is reduced.

In order to obtain a maximum utilization of the vacuum left by the mass exit of the burnt gases it is therefore necessary for the admission to open immediately after the depression is formed adjacent the inlet and with the greatest rate area of opening per unit movement of the piston, as explained in application Serial No. 84,182 filed June 8, 1936.

If the admission orifices are opened at an opportune moment and immediately when the exhaust gases have left the point in the cylinder at which these orifices are situated and if the area and time of opening are appropriate a column of admission gases will enter the cylinder and follow the exhaust gases into the exhaust duct.

The more massive this admission becomes, the more effective will be its action in destroying or reducing the intensity of the return impact thus rendering it more easy to establish a closure of exhaust before the return of the burnt gases.

If the opening of the inlet orifices is delayed the return impact will return more quickly and with greater violence; the absolute time available for admission will be reduced and the disturbances produced by the return impact will be greater and more violent.

It should here be noted that this reasoning is strict from the theoretical point of view. In practice a fairly large tolerance is admissible from the constructional point of view for a perfect operation of the engine, but the above directions must be taken into consideration in designing the engine so that this direction will be approached as closely as possible.

The time interval occupied by the exhaust, that is, the time required for the evacuation of the cylinder varies in an engine according to the arrangement of the exhaust system.

It also varies according to the resistance of the medium in these exhaust systems. These factors have a very great influence on the operation of the engine. A great variation in speed of rotation of the engine also influences the area time factor so that the duration of exhaust varies. But in any case the duration of time of exhaust in an engine for a given exhaust system remains practically constant.

The inventor has found that by modifying the exhaust system the time of duration of exhaust can be varied. For example this result may be obtained by an adaptation of the area of the exhaust orifices and of the time during which they open progressively. This may be described by the expression area time factor. Another factor is the variation of rate of opening of the exhaust orifice.

The useful area time factor must be considered to be that which has served effectively from the commencement of the mass exit of the burnt gases until the evacuation of the cylinder, which period of evacuation is relative to the energy of this exhaust and the result must be ensured that at each engine speed the useful area time factor is that required for the purpose specified.

The duration of the vacuum in the cylinder and the exhaust piping is determined by the moment at which the return impact occurs at the chosen point in either component, for example at a point along the exhaust piping, or in the cylinder or at a point in the cylinder.

The inventor has established that the absolute time that separates the exhaust and the return impact may be very small, or may be more or less great according as the phenomenon of exhaust and of the return impact follow each other immediately and consecutively or are separated by an appreciable lapse of time.

Similarly, the inventor has found that the return impact may be destroyed in the exhaust piping (application Serial No. 38,826, filed August 31, 1935, application Serial No. 82,959 filed June 1, 1936); it may be reflected (application Serial No. 738,016, filed August 1, 1934) and may not penetrate into the cylinder proper, it may be opposed by an injection of air or gas into the exhaust system (application Serial No. 46,804, filed October 25, 1935) and so on. The inventor has established and confirmed by the said curves that the return of the exhaust gases for one and the same exhaust system occurs in the same absolute time. This time or rather the length of this time is expressed by the number of degrees proportional to the speed of rotation.

If the resistance offered by the gaseous medium contained in the exhaust piping is reduced, the speed of exhaust over its duration of time will be greater and the time occupied for the complete evacuation of the cylinder will be smaller. In this case as is logical, the return will take longer to occur for the reason that the gaseous body will be projected for a longer distance, the position from which the return occurs will be further away, the initial speed of the gases being the same and the paths travelled being longer.

Further, by a suitable arrangement of the exhaust system, the reversal in direction of motion of the burnt gases can within limits be made to occur from a point more or less distant from the cylinder as desired.

For example Figure 6 shows the influence of altering the length of the exhaust pipe. This figure shows three curves taken on the same engine at the same speed and with three different lengths of exhaust pipe the length of the exhaust pipes being 2 feet 6 inches (chain dotted curve), 4 feet 5 inches (full line curve) and 5 feet 8 inches (dotted curve). It will be seen that as the length of the exhaust pipe increases the absolute duration of time of the vacuum or of the admission current is lengthened until a retardation which is a maximum for the exhaust pipe under consideration is reached, as is also explained in application Serial No. 84,182, filed June 8, 1936.

The series of curves taken at different speeds for the same arrangement of the exhaust system (Figures 1 to 5), the variation of these curves according to different arrangements of the exhaust system (Figure 6) and the variations in these curves as a consequence of the provision of specific arrangements (for example those described in applications Serial Nos. 38,826, 46,804, 46,805, 120,118, filed August 31, 1935; October 25, 1935; October 25, 1935 and January 11, 1937 respectively) introduced into these exhaust systems confirm the above statements.

A similar confirmation is obtained in the operation and output of the engine.

In establishing a fixed timing of inlet opening which will remain suitable over a chosen speed range of the engine and which is as close as possible to the moment at which the burnt gases leave the inlet orifice during their mass exit from the cylinder, the possibility of varying the above factors in order to obtain a desired result should be borne in mind.

For example by suitably varying the said factors it is easy to arrange so that the tendency of the time interval occupied by the total exit of the burnt gases to decrease with increasing engine speeds to be corrected so that this time interval is maintained more strictly constant. This may be effected by arranging or controlling the exhaust orifice in such a way that the area of exhaust orifice opened per unit movement of the piston or crankshaft decreases progressively as illustrated in Figure 15, and also by arranging the exhaust piping in such a way that the resistance to the mass exit of the burnt gases increases as the speed increases. For example the exit for the expanded gases from the silencer may be suitably restricted so that as the speed increases an increased resistance is created in the exhaust system.

Or the total exit of the burnt gases may be caused to be completed within a substantially constant crank angle, so that the inlet may be opened at the same position of the crank shaft for all working speeds of the engine.

For example the exhaust orifice may be so arranged or controlled that the area of exhaust orifice opened per unit movement of the piston or crankshaft increases progressively as illustrated in Figure 16, whereby the time period elapsing before the total exit of the burnt gases occurs may be reduced progressively as the engine speed increases.

A two-stroke cycle internal combustion engine embodying an exhaust orifice of this nature is illustrated in Figure 17, and comprises a cylinder 1 in which moves a piston 2 controlling an exhaust orifice 3 situated at the base of the cylinder and communicating with an exhaust duct 4. At the head of the cylinder is an injector 5 for the introduction of combustible fuel, and an inlet orifice 6 communicating with an inlet duct 7, and controlled by a poppet valve 8 by a push rod 9 and rocker arm 10 from the engine shaft 11.

A suitable arrangement of the exhaust piping will also assist in obtaining this reduction as the speed increases, for example by the provision in the exhaust pipe of the means described in application Serial No. 82,959 filed June 1, 1936, or, in a multicylinder engine, by a suitable arrangement of the exhaust manifolds as described in application Serial No. 84,182 filed June 8, 1936.

In the practical establishment of an engine it is more advantageous to arrange that the exhaust occurs over a constant crank angle than to arrange that exhaust occurs over a constant time interval since in the first case the admission orifices may be opened by the piston or by valve means controlled in fixed angular relation with the engine crank shaft, while in the second case the admission orifices must be opened by a distribution system employing a movement which is independent of the rotation of the engine, and extends over a constant lapse of time, but the commencement of the lapse of time will always start from the same point on the crank circle.

For example this may be done by means of a slide valve with a stressed spring. The release of this spring will be produced always for the same position of the piston for example. Consequently the initiation of the opening will be in direct relation with the position of the crank, but the opening itself will be produced in a constant lapse of time absolute which is independent of the speed of rotation of the engine. Instead of springs this may be effected by electro-magnets, by a hydraulic control or by a control utilizing gas under pressure, which is not important from the point of view of principle, but it is merely a constructional detail. The principle is that this opening is effected after a constant lapse of time after the commencement of opening of the exhaust as specified above.

The more the opening of the admission orifices is accelerated, the more advantageous it is for introducing the largest possible mass of fresh gases, and consequently for filling the void left by the exhaust gases and for opposing to the greatest possible extent the return of the burnt gases by the inertia of the entering charge, while a further advantage will be the retardation of the return impact due to the fact that the force exerted on the gaseous medium in the exhaust pipe by the burnt gases will be increased by the force exerted in the same direction by the entering charge.

From the double curves shown in Figures 1 to 5 it can be seen that after the end of the exhaust, the admission gases follow behind the exhaust gases and consequently they have passed through the cylinder, have occupied its entire volume, have swept through it and entered the exhaust duct and continue to do so until the reversal in direction occurs which is produced by the return impact which sometimes arrives towards the end of the admission and sometimes even after the closure of inlet.

During these phases the cylinder although occupied with fresh air charge is under depression and it is advantageous to re-establish the pressure to the level of the atmosphere or to that which exists at the admission orifices outside the cylinder.

The volume left void in the cylinder and in the exhaust duct is very great, and it is not possible for the entering charge to fill the whole of this void completely and without delay on account of the fact that the velocity of outward movement of the mass of burnt gases is much higher than that of the entering charge, which enters the cylinder by expansion. This fact is illustrated by the exhaust pressure curves in Figures 11 to 14. These curves were all taken at the same engine speed, but with an admission pressure which is greater than atmospheric pressure by 100, 200, 300 and 400 gms. per cm$^2$, in Figures 11, 12, 13 and 14 respectively.

It will be seen from these curves that the well defined drop in pressure which is formed in the exhaust duct in the middle of the admission period still exists when the charge enters at a pressure of 400 gms. above atmospheric pressure.

In general this dip in the curves appears for many causes, which have the same result, which is an insufficiency of entering air from the admission to fill the void left by the exhaust gases in the cylinder and in the ducts traversed by the exhaust gases and left void. In certain cases this unfilled void may act in an objectionable manner upon the final charge in the cylinder by leaving it depressed below the pressure existing in the atmosphere external to the cylinder around the admission ports.

In practice, it is frequently difficult or incompatible for other reasons to make the admission orifices sufficiently large to permit the void to be filled. Further, the exhaust orifices may be too small to permit a sufficient charge to pass through the cylinder into the exhaust duct to fill the void or the exhaust orifices may be too large relative to the admission orifices so that the charge is absorbed by escapement through the exhaust orifices more rapidly than it can be admitted through the admission orifices.

We have seen that the absolute time of duration of the admission both as regards the fresh charge that has penetrated through the inlet ports and from the point of view of the return which limits the existence of the void is a factor which is not tied directly to the angular speed of rotation of the engine. These are times which have a constant duration in their absolute value with small variations due to other causes enumerated.

In order to permit a full utilization to be made of the void left in the cylinder and in the exhaust pipe by the mass exit of the burnt gases and to obtain the advantage of cooling the cylinder by the air that passes through the latter and enters the exhaust duct while avoiding any objectionable effect due to the fact that the void left in the exhaust duct behind the burnt gases cannot be completely filled, it is more rational to close the exhaust at a suitably chosen moment for the design of the engine. For example, the condition may be imposed that exhaust will be left open during the period of exit of the burnt gases and during a half, quarter or three quarters of the period of admission. During this time the cylinder is traversed by a current which cools the piston and the walls of the cylinder internally. If the exhaust is then closed, the current is stopped and no further passage of the charge into the exhaust duct can occur.

For example, the closure of exhaust may be produced after a constant lapse of time. The commencement of this time will be for example the opening of the exhaust orifices or any point upon the crank circle of the engine. In this case the time of passage of the current through the cylinder will always be constant in its duration.

Or a point may be chosen for the closure of exhaust upon the crank angle so that during the period between the opening and closure of exhaust the admission is produced and the current passes through the cylinder, in such a way that the closure of exhaust will remain always in the period of admission, so that with the variation in engine speeds the return impact will never come before this point and the end of the evacuation of the cylinder will never occur after this point.

This solution can be arrived at by all kinds of distributions such as the piston of the engine itself, sleeves, sliding members, rotary valves, baffles and other mechanical arrangements controlled by the rotation of the engine.

It is to be noted that these two solutions are easy to establish mechanically for the reasons that exhaust devices may be established which give sufficiently long durations of time between the end of the exhaust of the burnt gases from the cylinder and the return impact which reverses the current in the cylinder and the ducts.

Such methods are described in one or the other of applications Serial Nos. 738,014, 738,015, 738,016, 745,814, 39,826, 46,804, 46,805, filed August 1, 1934; August 1, 1934; August 1, 1934; September 27, 1934; August 31, 1935; October 25, 1935; October 25, 1935, respectively, and they concern the length of pipes, their shape, their volume, for example the shape of the tube which allows the gases to travel the furthest distance from the cylinder and gives the least violent return impact will be that of a tube which will have a cross section slightly greater than the surface of the exhaust orifices which is truly active during the exhaust period itself and which will have a slight conicity as the distance from the cylinder increases. The truly effective length is equal to the length of the path travelled by the column of exhaust gases as far as the point from which they rebound and this will be for the strongest charge in the cylinder in air and fuel, because this distance is proportional to the energy of the volume introduced, as explained in application Serial No. 84,182, filed June 8, 1936.

With the timing of exhaust closure as described above, it will be seen that over the chosen speed range of the engine, the exhaust will always close after the entering charge has had time to occupy the cylinder and enter the exhaust duct, before the return of the burnt gases can occur and before a prolonged suction can exert any action in drawing the charge out of the cylinder into the exhaust duct.

When the exhaust orifice is closed, however, the charge contained in the cylinder may be under a depression and it will therefore be advantageous for the admission to close later than the exhaust so that the balance of pressure between the cylinder and the external source of the fresh charge may be re-established.

It is to be observed that in the two cases indicated above and in which admission closes after the exhaust, the admission and the charging of the cylinder will be produced in two phases. In the first phase, fresh gases under depression will pass into the cylinder and into the exhaust duct and in the second phase when the exhaust has been closed the balance between the pressure in the cylinder and the pressure of the source of supply will be re-established.

The moment of opening of exhaust orifices and the moment of closure of the admission orifices must be chosen in such a way that the active cylinder volume is as large as possible, that is to say the volume contained in the cylinder at the moment when the last port closes.

The closure of exhaust before the closure of inlet established in the manner specified above is very advantageous in this connection.

Figure 10 shows by way of example a suitable port area diagram and timing of the inlet and exhaust events for a cylinder of 1.5 litres capacity, based on the foregoing remarks.

In this figure the curve 1 relates to the opening of the exhaust orifice and the curve 2 to the opening of the inlet orifice. The ordinates of the curves represent port areas and the abscissae represent crank angles.

In this figure the shaded portion e of the exhaust curve represents the period during which the mass exit of the burnt gases will occur over a wide range of engine speeds to ensure that inlet will always open as close as possible to the moment of mass exit of the burnt gases.

The overlapping portions of the two curves represent the period during which both the exhaust orifice and the inlet orifice are open and during which the charge will enter due to the difference in pressure between the source of supply and the interior of the cylinder and exhaust system, and it will be understood that the velocity acquired by the incoming charge will assist the charging and that this velocity will be highest when the void left by the burnt gases is greatest and the delay before the return of the burnt gases occurs is a maximum.

The portion a of the inlet curve represents the period during which the exhaust orifice is closed and the inlet orifice remains open for completing the charging and it will be understood that during this period the pressure in the cylinder will be restored to the pressure of the source of supply and that the velocity acquired by the entering charge will also assist the charging during this period a.

For this reason it is again advantageous that the delay in the return of the burnt gases should be a maximum.

I claim:

1. Method of controlling two stroke cycle internal combustion engines, which comprises establishing communication between the cylinder and exhaust system during the firing stroke, providing for the issuance of the burnt gases from the cylinder substantially as a mass in an interval of time shorter than that which would be required for the burnt gases to expand down to the ambient pressure by adiabatic flow, whereby the mass of gases moves outward and thereafter returns from a point which may be within the exhaust system, providing a permanent free passage for the burnt gases to the limit of outward travel of said burnt gases, providing for the said issuance of the burnt gases to occupy a substantially constant crank angle over a chosen range of engine speeds, preventing the entrance of fresh charging air until the said issuance of the burnt gases is in full progress, admitting fresh charging air into the cylinder when the said issuance of the burnt gases is in full progress and causes a suction effect to be exerted in the cylinder, while the exhaust port is still open, and providing for the said fresh charge to occupy the cylinder and a portion of the exhaust system in the interval elapsing between the said exit of the burnt gases and the instant when the pressure of the returning gases becomes effective within the cylinder.

2. Method of controlling two-stroke cycle internal combustion engines, which comprises establishing communication between the cylinder and exhaust system during the firing stroke, providing for the issuance of the burnt gases from the cylinder substantially as a mass in an interval of time shorter than that which would be required for the burnt gases to expand down to the ambient pressure by adiabatic flow, whereby the mass of gases moves outward and thereafter returns from a point which may be within the exhaust system, providing a permanent free passage for the burnt gases to the limit of outward travel of said burnt gases, providing for the said issuance of the burnt gases to occupy a progressively and substantial decreasing interval of time with increasing engine speed over a chosen range of engine speeds, preventing the entrance of fresh charging air until the said issuance of the burnt gases is in full progress, admitting fresh charging air into the cylinder when the said issuance of the burnt gases is in full progress and causes a suction effect to be exerted in the cylinder, while the exhaust port is still open, and providing for the said fresh charge to occupy the cylinder and a portion of the exhaust system in the interval elapsing between the said exit of the burnt gases and the instant when the pressure of the returning gases becomes effective within the cylinder.

3. A two-stroke cycle internal combustion engine having a cylinder, a piston moving in the cylinder, exhaust and inlet orifices in the cylinder, an exhaust conduit on the exhaust orifice, means for so controlling the exhaust orifice during the firing stroke as to ensure the issuance of the burnt gases as a mass, whereby the said mass moves outward and thereafter returns from a point which may be within the said conduit, means whereby the area of exhaust orifice opened per degree of crank shaft movement increases progressively substantially throughout the exhaust orifice opening period, means for so controlling the inlet orifice as to ensure that it will be opened while the exhaust orifice is still open and when the said issuance of the burnt gases is in full progress and produces a suction effect in the cylinder, the said conduit providing a permanent free passage for the burnt gases to the limit of outward movement of said gases and providing a passage for the gases during their outward motion as a mass having no cross section of substantially greater area than any cross section thereof further from the cylinder and no abrupt and substantial increase in volume for a length substantially equal to the limit of outward travel of the mass of burnt gases.

MICHEL KADENACY.